United States Patent [19]
Presti et al.

[11] Patent Number: 5,518,384
[45] Date of Patent: May 21, 1996

[54] RADIALLY EXPANDABLE AND RETRACTABLE RIM

[76] Inventors: Barry W. Presti, 3701 Windridge Dr.; Duane E. Presti, 44 John Dyer Way, both of Doylestown, Pa. 18901

[21] Appl. No.: 288,008

[22] Filed: Aug. 10, 1994

[51] Int. Cl.[6] .................................................. B29C 35/00
[52] U.S. Cl. ........................... 425/36; 425/28.1; 425/39; 156/95; 156/96; 156/398; 156/403
[58] Field of Search ............................. 425/36, 28.1, 39; 156/95, 96, 398, 403

[56] References Cited

U.S. PATENT DOCUMENTS

| | | | |
|---|---|---|---|
| 2,665,967 | 1/1954 | Bean et al. | 425/36 |
| 3,113,344 | 12/1963 | Frohlich et al. | 425/36 |
| 3,919,020 | 11/1975 | Floto | 156/95 |
| 3,999,907 | 12/1976 | Pappas | 425/50 |
| 4,181,483 | 1/1980 | Pech | 425/36 |
| 4,600,467 | 7/1986 | Perdue | 156/394.1 |
| 4,634,357 | 1/1987 | Brewer et al. | 425/36 |
| 4,869,759 | 9/1989 | King et al. | 156/96 |
| 5,098,268 | 3/1992 | Robinson | 425/14 |

*Primary Examiner*—Timothy M. McMahon
*Assistant Examiner*—N. Bhat
*Attorney, Agent, or Firm*—Joseph W. Molasky & Associates

[57] ABSTRACT

A radially expandable and contractible rim used to secure an annular elastomeric sealing ring to a tire bead during retreading of a tire.

20 Claims, 5 Drawing Sheets

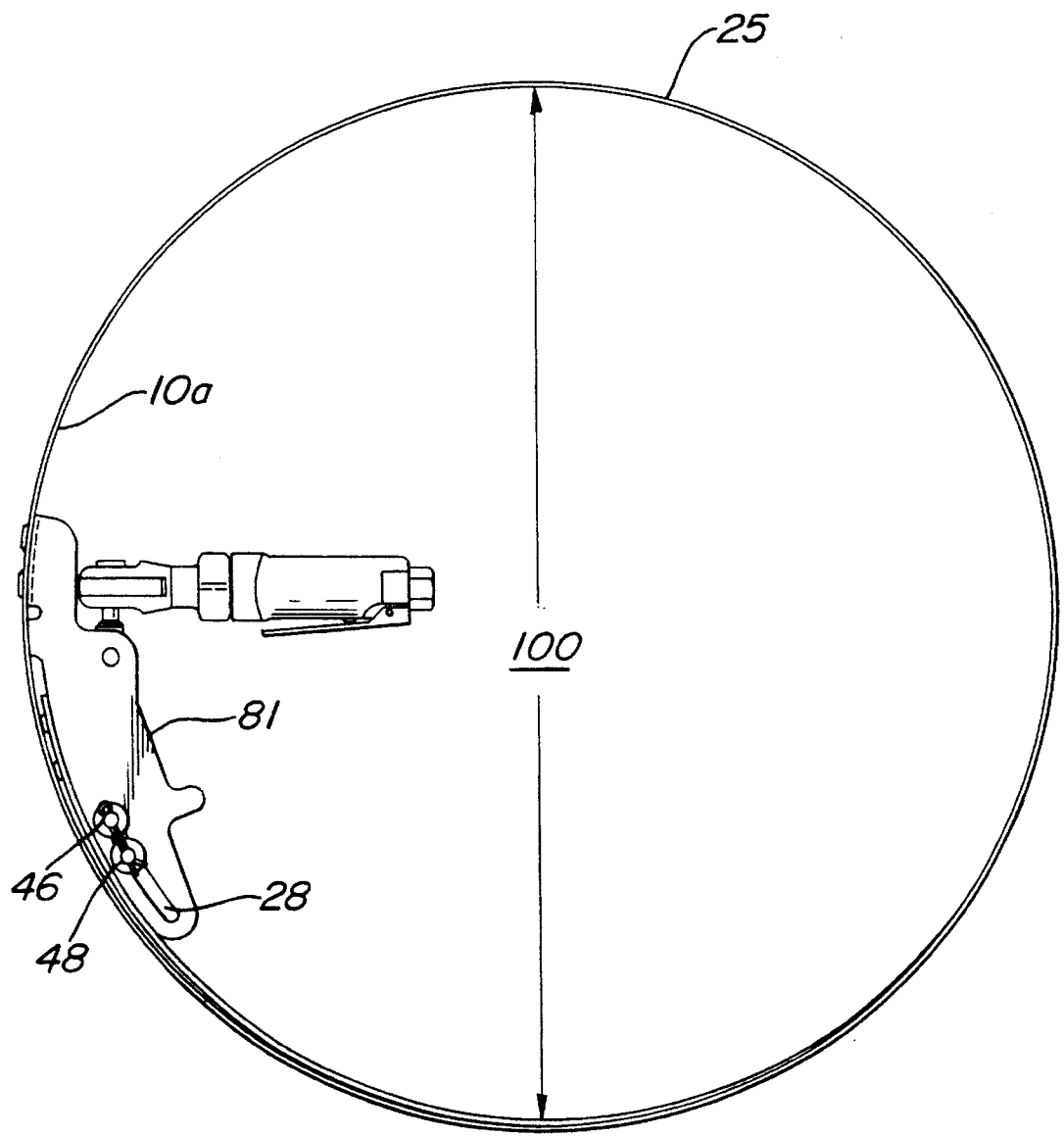

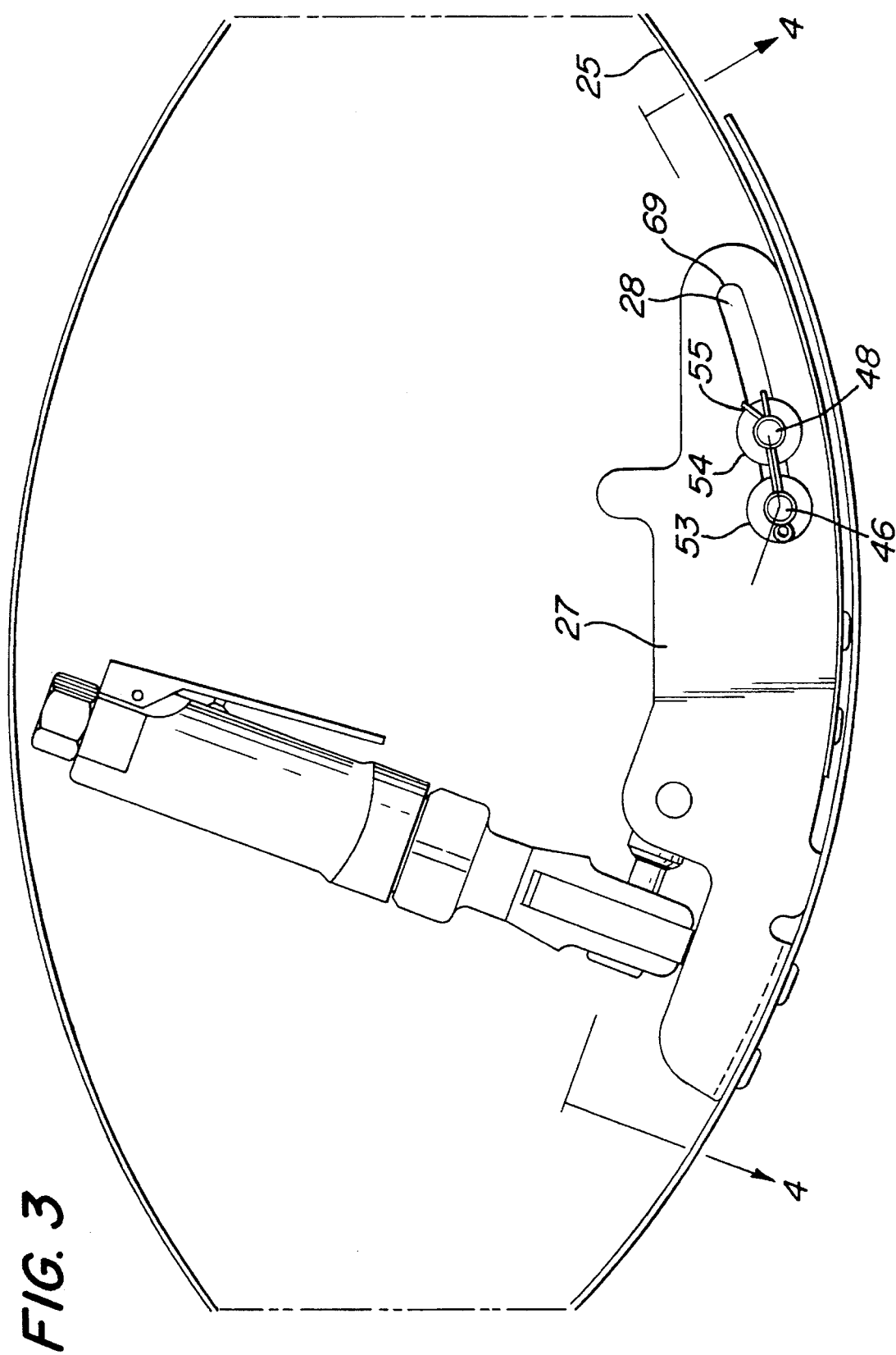

RADIALLY EXPANDABLE AND RETRACTABLE RIM

BACKGROUND OF THE INVENTION

The present invention relates to tire retreading, and more particularly, it relates to a radially expandable and contractible rim for securing an annular elastomeric member against a tire bead.

Tire retreading, or recapping, may be applied to any size tire casing but is more commonly used on radial truck tires. The casings of these tires usually have a longer useful life than their treads. Therefore, it is often more cost effective to retread a worn casing than to replace it with a new tire.

One known process simultaneously bonds and vulcanizes uncured rubber on a worn tire casing in a tread forming mold. In another known process, a precured rubber strip with a premolded tread is wrapped around the buffed crown surface of the worn tire casing with a bonding agent such as uncured rubber or cushion gum disposed therebetween. The assembly is then sealingly enclosed in an annular elastomeric curing envelope of U-shaped radial cross section typically of thin synthetic rubber, or the like as manufactured by Presti Rubber Products, Inc. of New Britain, Pa. The annular space between the tread and the envelope is evacuated, thereby stretching the outer envelope into intimate contact with the outer sidewalls of the casing and all surfaces of the tread strip. This ensures that uniform pressure is applied over the entire bonding area without tread distortion during the curing process. The outer envelope also prevents air and steam from becoming entrapped between the tread strip and the casing and migrating into the bonding agent. The entire assembly is then placed in a curing chamber, or autoclave, at elevated temperatures and pressures to vulcanize the uncured components and to positively bond the casing and tread strip together. The outer envelope is then removed for reuse if desired.

Outer curing envelopes as described are not as easy to install as desired, especially when smaller inside circumference envelopes need to be pulled over the outside circumference of large truck tire casings. Therefore, various special mountings, rims, and linings have been developed to facilitate sealing of the curing envelope around the tire casing and tread assembly.

In one known commercially available arrangement, the side skirts of the outer curing envelope are made longer than the sidewalls of the tire casing with which it is to be used. The excess margin of the outer envelope, i.e., the margins adjacent to the inner peripheries of the skirts, are tucked inside the tire beads and held in place by a radially-expandable rim. In this arrangement, the inside surface of the tire casing is exposed while the entire outside is encased.

Another arrangement involves the use of sealing rings with an outer curing envelope as described in U.S. Pat. No. 5,098,268 to Robinson.

Known radially-expandable rims typically are constructed of a metal band having a locking device which adjusts the rim to an initial relaxed circumference smaller than the bead circumference of the tire to be retreaded and to an expanded circumference which is larger than the bead circumference.

Known rims, however, cannot be incrementally adjusted in size from the initial relaxed circumference to the expanded circumference to account for different tire bead circumferences. Most known rims rely on spring compression to expand the ring and, thus, require good hand and arm strength to mount the rim against a tire bead and to dismount the rim after retreading is complete. In addition, some expandable rims do not maintain a constant circular shape and instead become slightly elliptical during the retreading process. Elliptically shaped rims can allow flaws to occur in the retreaded tire during the curing process. Thus, a need exists for a radially expandable and contractible rim for use to secure an annular elastomeric member against a tire bead during tire retreading which is incrementally expandable and retractable, which is easy to mount against and dismount from a tire bead and which maintains its circular shape throughout the retreading process.

SUMMARY OF THE INVENTION

Accordingly, it is an object of the present invention to provide a novel radially expandable and contractible circular rim for securing an annular elastomeric member against a tire bead which is incrementally adjustable so that the rim and elastomeric member can be utilized to retread tires of varying bead circumference.

Another object is to provide a radially expandable and contractible circular rim which, when used with a elastomeric member, is easy to mount on and dismount from a tire bead.

Briefly, these and other objects and advantages of the invention are accomplished by a radially expandable and contractible circular rim for securing an annular elastomeric member against a tire bead. The rim comprises a housing, a carriage slidably attached to the housing, an expandable and contractible screw assembly attached to the housing and to the carriage, and a circular metal band attachable to an annular elastomeric member. The circular metal band has a first end and a second end. The first end of the metal band is attached to the housing and the second end of the metal band is attached to the carriage. The circular metal band has a circumference which expands and contracts in response to expansion and contraction of the screw assembly.

Other objects, features, and advantages of the invention will become more apparent from the following detailed description of the invention when considered in conjunction with the accompanying drawings.

BRIEF DESCRIPTION OF THE DRAWINGS

FIG. 2 is a side view of the incrementally expandable and contractible rim.

FIG. 3 is an enlarged side view of the rim taken along line 3—3 of FIG. 1.

DESCRIPTION OF THE PREFERRED EMBODIMENTS

Figure 1:
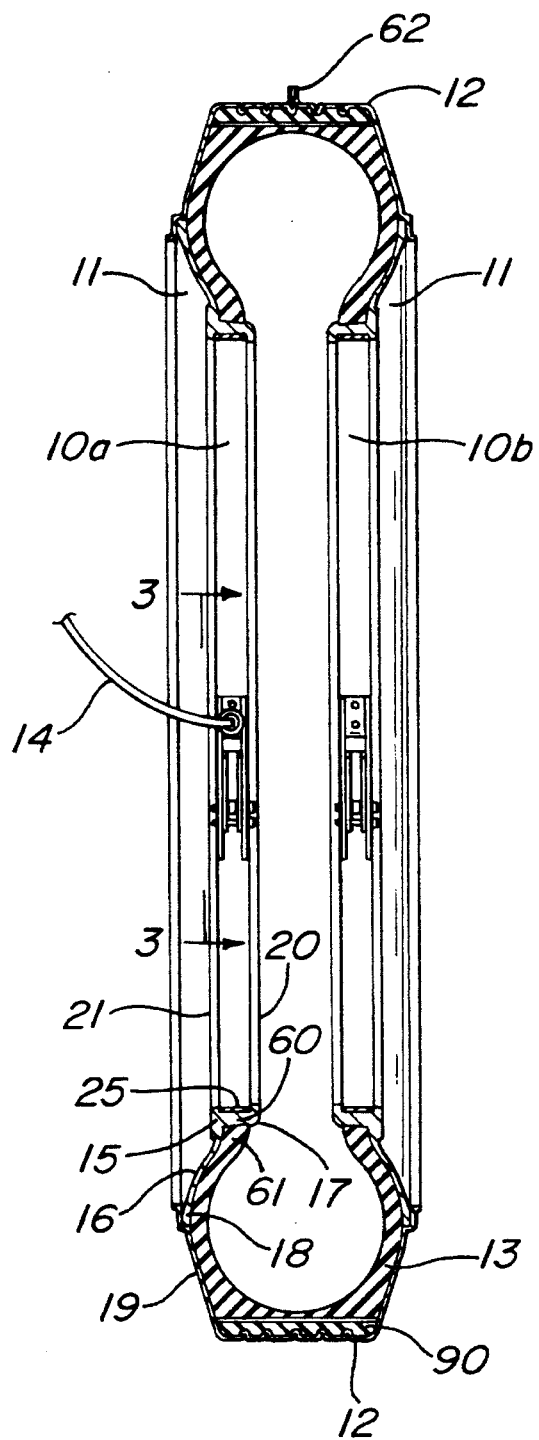
FIG. 1 is a radial cross-section of a tire with two attached rims, one rim attached to each bead and a power tool attached to the left rim.

Referring now to the drawings wherein like characters designate like or corresponding parts throughout the several views. FIG. 1 shows a pair of reusable radially expandable rims 10a and 10b installed with identical elastomeric curing envelope sealing rings 11 and with an annular outer curing envelope 12 on a tire casing 13 having a tread 90 prepared for retreading. Rims 10a and 10b are identical in all respects except for being mounted on opposite sides of the casing. Power tool 14 is shown attached to rim 10a to illustrate where the power tool connection is made and will be explained in greater detail herein later. A valve 62 in outer envelope 12 provides a connection for drawing a vacuum in the space between the outer envelope and the tire casing, thus, forming a seal between the sealing rings 11 and the outer envelope 12. Each sealing ring 11 is comprised of a one-piece annular molded elastomeric channel member having a base portion 15, an outer flange portion 16 and an inner lip 17. Flange 16, base 15, and lip 17 are shaped to enclose the tire bead and a portion of the outer sidewall of the tire. The outer flange 16 includes an annular sealing rib 18 with a thickened rim for underlying engagement with a skirt 19 of outer curing envelope 12. Base 15 has a ledge 20, a berm 21, and a groove 60, whose purpose will be explained herein later.

Figure 5:
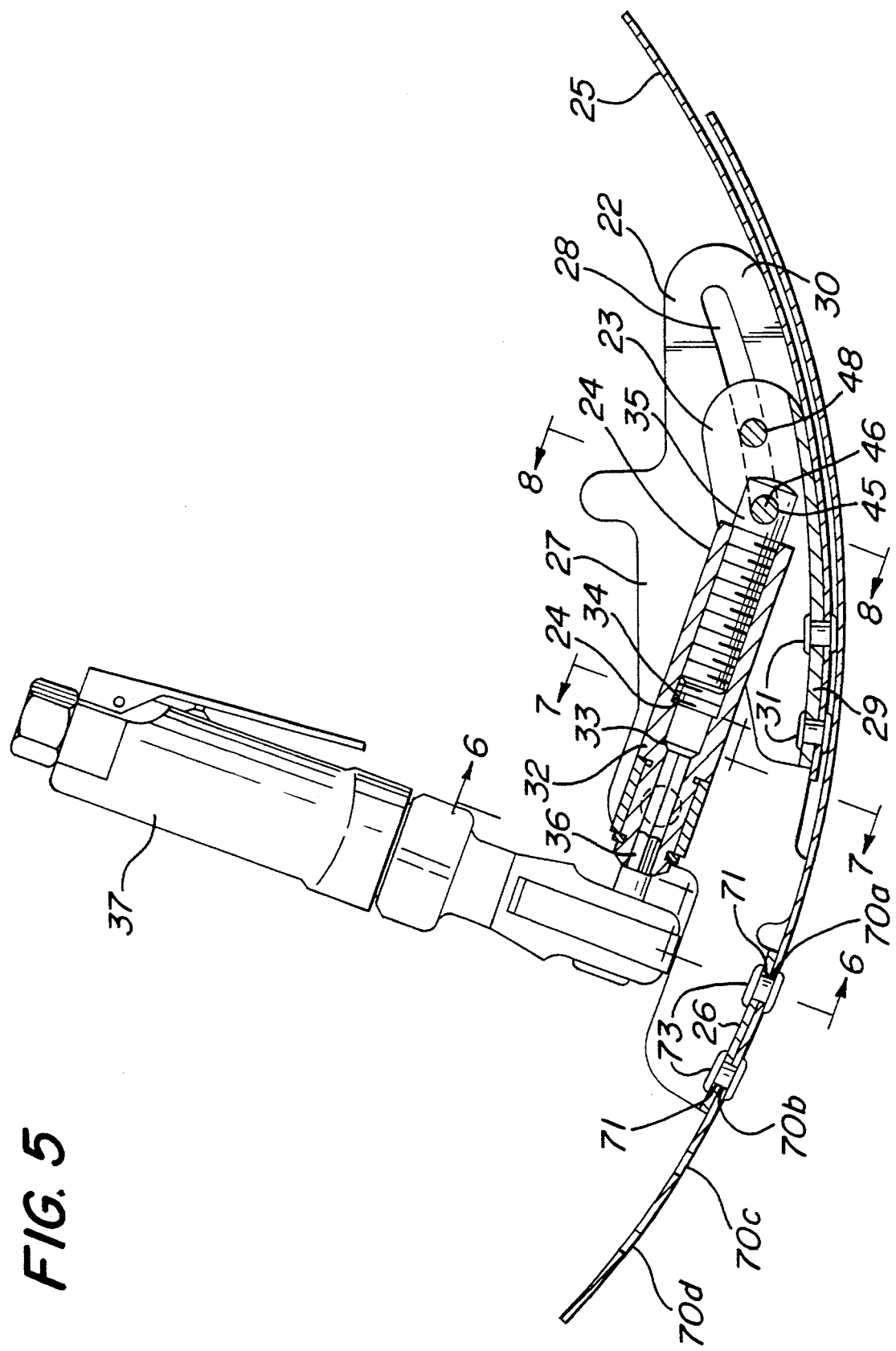
FIG. 5 is a partially cut-away, sectional view taken along line 5—5 of FIG. 4.

Rims 10a and 10b are identical, therefore, only rim 10a is described in detail. Rim 10a is comprised of a housing 22, a carriage 23 slidably attached to housing 22, an expandable and contractible screw assembly 24 attached to housing 22 and attached to carriage 23 and a generally circular metal band 25 attached to housing 22 and attached to carriage 23 as shown in FIG. 5. The entire circumference of band 25 is shown in FIG. 2.

Figure 4:
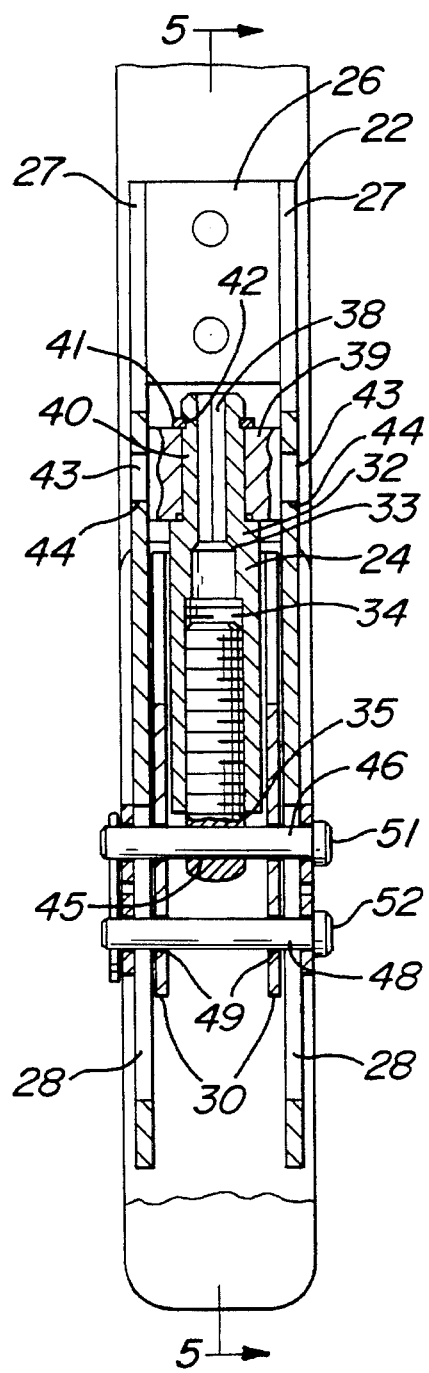
FIG. 4 is a partially cut-away top view taken in the direction of line 4—4 of FIG. 3.
Figure 6:
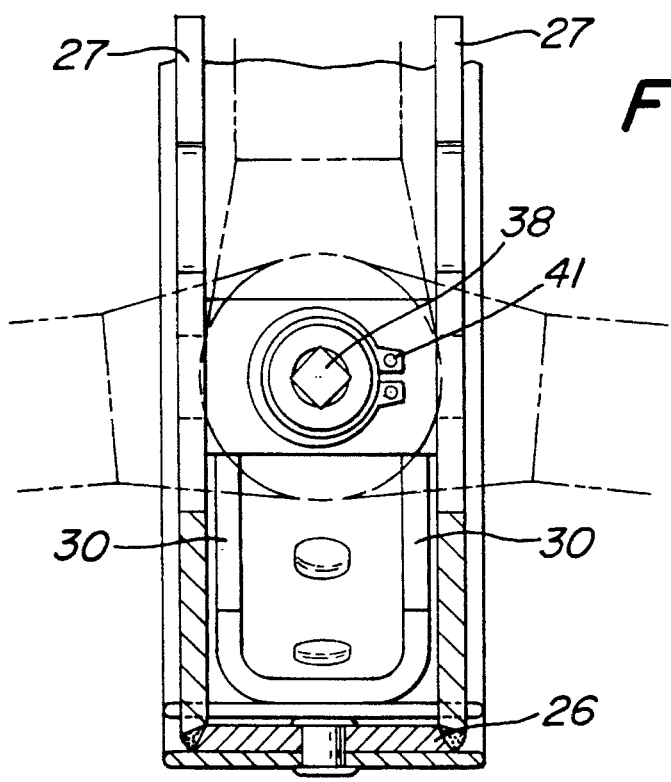
FIG. 6 is an enlarged sectional view taken along lines 6—6 of FIG. 5.

Housing 22 is comprised of a base plate 26 shown in FIGS. 4, 5, and 6 and two side panels 27 attached to base plate 26 shown in FIGS. 3, 4, 5, and 6. Base Plate 26 is attached to band 25 preferably by button-head cap screws 72 with round headed nuts 73 as shown in FIG. 5 which are removably disposed in band orifices 70a and 70b and housing base plate orifices 71. Side panels 27 are identical, each having a slot 28 as shown in FIGS. 3 and 5.

Carriage 23 is comprised of a base plate 29 shown in FIG. 5 and two identical side panels 30 shown in FIGS. 4, 5, and 6. Carriage base plate 29 is attached to band 25 preferably by rivets 31 as shown in FIG. 5.

Figure 7:
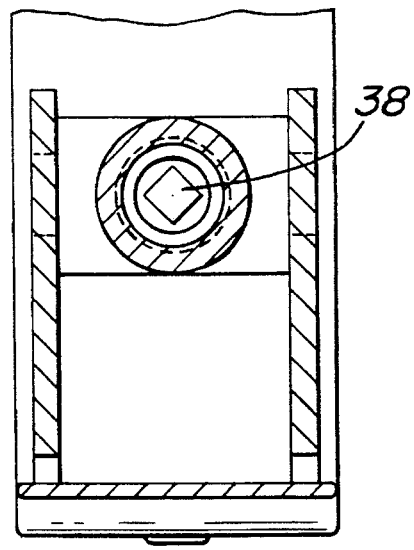
FIG. 7 is an enlarged sectional view taken along lines 7—7 of FIG. 5.

Screw assembly 24 is comprised of a tube 32 equipped with a bore 33 at least a portion of which is threaded as shown by threaded section 34 in FIGS. 4 and 5 and a threaded bolt 35. Bore 33 also has a ratchet receptacle portion shown herein as square portion 38 in FIGS. 4, 6, and 7 to accommodate a square-ended air ratchet such as ratchet end 36 of ratchet 37 as shown in FIG. 5. The ratchet receptacle portion can be square, hexagonal or any other shaped orifice which allows tube 32 to be rotated by a power tool. In lieu of an orifice, a square or a hexagonal protuberance could also be utilized for attachment of a powered wrench.

Tube 32 of screw assembly 24 is attached to housing 22 by bushing 39 as shown in FIG. 4. Bushing 39 has a bore 40 through which tube 32 is rotatably disposed. Tube 32 is kept from sliding out of bushing 39 by retaining ring 41 which is disposed in groove 42 in tube 32 as shown in FIGS. 4 and 6. Bushing 39 has two studs 43 which are rotatably disposed in bores 44 in side plates 27 of housing 22 as shown in FIG. 4.

Figure 8:
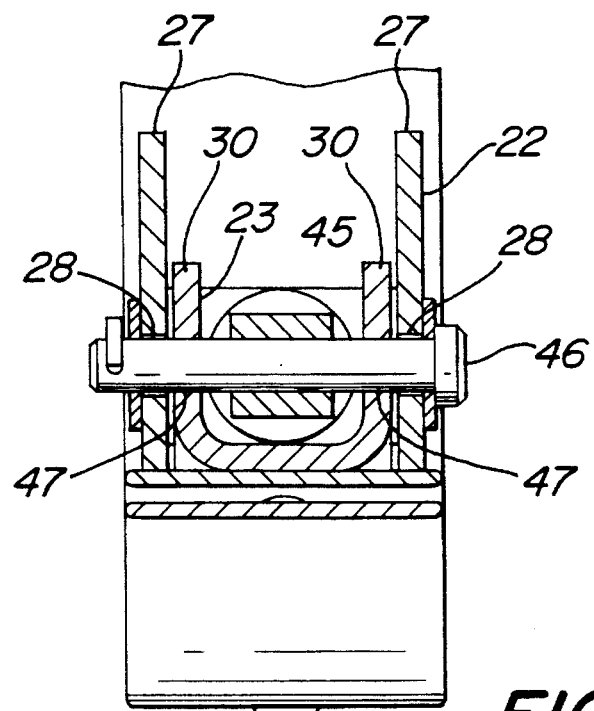
FIG. 8 is an enlarged sectional view taken along lines 8—8 of FIG. 5.

Threaded bolt 35 of screw assembly 24 is threadably disposed within bore 33 of tube 32 as shown in FIGS. 4 and 5. Bolt 35 has a bore 45 in which pin 46 is removably disposed as shown in FIGS. 4 and 8. Pin 46 is removably disposed through bore 47 in side panels 30 of carriage 23 and both removably and slidably disposed through slot 28 in side panels 27 of housing 22 as shown in FIG. 8. Pin 46, thus, attaches screw assembly 24 to carriage 23 and housing 22. Pin 48 shown in FIGS. 4 and 5 is disposed in bores 49 in side panels 30 of carriage 23 and in slots 28 in side panels 27 of housing 22. Pins 46 and 48, each having heads 51 and 52, respectively shown in FIG. 4, are disposed through washers 53 and 54 and are attached together by cotter pin 55 as shown in FIG. 3.

Rim 10a is utilized by inserting band 25 into a groove 60 in base 15 of elastomeric sealing ring 11 as shown in FIG. 1. Band 25 is positioned within groove 60 such that one edge of band 25 is adjacent ledge 20 and one edge of band 25 is adjacent berm 21. Ledge 20 allows the user to force rim 10a into groove 60 between ledge 20 and berm 21 and keeps rim 10a from being pushed completely through sealing ring 11. Berm 21 is merely a bump or raised line sufficiently high enough to retain rim 10 against ledge 20 yet low enough for the user to easily remove rim 10 from groove 60.

In the contracted configuration of the sealing ring and rim assembly, the circumference of the assembly is slightly smaller than the circumference of the bead on the tire to be retreaded allowing easy placement of the assembly adjacent a tire bead. A ratchet such as the air powered ratchet 37 shown in FIGS. 3 and 5 is then inserted into the square portion 38 of bore 33 as shown in FIG. 5. Air ratchet 37 is then powered to turn end 36 in a counterclockwise direction. Counterclockwise turning of end 36 causes tube 32 to spin within ring 41 and bushing 39. Counterclockwise spinning of tube 32 forces threaded bolt 35 to extend from the threaded portion 34 of bore 33 in tube 32. As bolt 35 extends from bore 33, bolt 35 puts pressure on pin 46. Pin 46 is attached to carriage 23 and is slidably disposed within slots 28 of housing 22. Therefore, as bolt 35 extends, it forces pin 46 to slide within slot 28 and also forces carriage 23 to move which, in turn, forces pin 48 to slide within slot 28 from the contracted position shown in FIG. 3 to an expanded position where pin 48 is near slot end 69. Since housing 22 is fixed by screws 72 and nuts 73 to band 25 and carriage 23 is fixed to band 25 by rivets 31, the circumference of band 25 shown in FIG. 2 is forced to expand within the limits of the length of slot 28 by pins 46 and 48. Thus, each turn of tube 32 incrementally causes an extension of bolt 35 from tube 32 which incrementally increases the circumference and the diameter 100 of circular band 25 on rim 10a. Since sealing ring 11 is an elastomeric member, ring 11 stretches to accommodate the expanded circumference of rim 10a. The user, therefore, uses ratchet 37 to expand rim 10a until the sealing ring and rim assembly expands to a circumference approximately the same size as tire bead 61 thereby mounting the assembly adjacent bead 61 of tire 13 as shown in FIG. 1. Ratchet 37 is then removed and the same procedure is then repeated on the other tire bead by rim 10b and a sealing rim 11. Outer sealing envelope 12 is then placed over tire casing 13 to be retreaded to form a sealed outer enclosure, and a vacuum is then drawn via valve 62. The tire is then placed in a curing oven to bond the new tread 90 to tire 13. Rims 10a and 10b tightly seal the two sealing rings 11 against the tire beads, thus, allowing a good vacuum to be maintained within the retreading envelope assembly throughout the retreading process. During the retreading process, the tire secured within the sealed outer enclosure is typically hung from racks. The arcuate shape of housing 22 allows the tire, rim and elastomeric enclosure assembly to be hung on the racks without circular band 25 becoming elliptical. In addition, housing panels 27 have a flat portion 81 as shown in FIG. 2 to provide a location from which the tire and retreading assembly can be conveniently hung from a rack.

When curing is completed, ratchet end 36 is then inserted into square portion 38 of bore 33 and a clockwise torque is exerted on tube 32. Tube 32 then rotates in a clockwise direction causing bolt 35 to be drawn into the threaded portion 34 of bore 33 in tube 32. As bolt 35 is drawn into tube 32, it pulls pin 46 toward the ratchet 37 along slot 28 and away from slot end 69, thereby drawing carriage 23 toward ratchet 37 and thereby contracting the circumference of band 25. Contraction of the circumference of band 25 allows the stretched sealing ring to relax and pulls the sealing ring and rim away from the tire bead allowing the sealing ring and rim to be removed from the tire. The same removal procedure is then repeated for the other ring and rim assemblies, the outer sealing envelope 12 is removed and the tire retreading is completed.

This invention also provides the user with the ability to tailor the rim to a wide variety of tire bead circumferences by virtue of housing 22 which is removably attached to a band 25. If the range of band circumference expansion or contraction which is provided by housing slot 28 does not match a tire bead circumference, screws 72 and nuts 73 attaching housing base plate 26 to band 25 can be removed and housing base plate orifices can be aligned with the desired band orifices 71 to achieve the variation in band circumference contraction and expansion needed to attach the rim and elastomeric sealing ring assembly to a tire bead. This is shown in FIG. 5 where housing base plate 26 is attached to band 25 at two band orifices 70a and 70b. However, to achieve a decreased range of band circumference expansion and contraction, base plate 26 could be attached to band 25 at orifices 70b and 70c or 70c and 70d. Band 25 is shown in FIG. 5 to have four orifices; however, four or more orifices are preferred to provide variable band circumferences beyond the range of variable band circumference provided by slots 28 in housing side panels 27.

Thus, the invention provides a rim which is radially expandable and contractible for securing an annular elastomeric sealing ring against a tire bead for use in retreading a tire. The rim is incrementally expandable and contractible by virtue of a screw assembly and an adjustable housing, allowing the rim to be utilized on a wide variety of tires having varied bead circumferences. The rim also can be mounted and dismounted within a tire bead circumference with relative ease since the rim expansion and contraction is constructed to be driven by power tools, thereby eliminating manually operated springs and levers which require more physical effort to use than does the rim of this invention.

This invention has been described by reference to precise embodiments, but it will be appreciated by those skilled in the art that this invention is subject to various modifications and to the extent that those modifications would be obvious to one of ordinary skill they are considered as being within the scope of the appended claims.

We claim:

1. A radially expandable and contractible rim for securing an annular elastomeric member against a tire bead, said rim comprising:

a) a housing;

b) a carriage, said carriage slidably attached to said housing;

c) an expandable and contractible screw assembly, said screw assembly attached to said housing and to said carriage; and d) a circular metal band attachable to an annular elastomeric member, said circular metal band having a first end and a second end, said first end of said metal band attached to said housing and said second end of said metal band attached to said carriage, and said circular metal band having a circumference which expands and contracts in response to expansion and contraction of said screw assembly.

2. The rim of claim 1 wherein said housing is comprised of a housing base plate and two housing side panels, said housing base plate adjustably attached to said metal band, said two housing side panels approximately parallel to each other and each said housing side panel having a slot, said slots located approximately parallel to each other.

3. The rim of claim 2 wherein said carriage is comprised of a carriage base plate and two carriage side panels, said carriage base plate attached to said metal band, said two carriage side panels approximately parallel to each other and each said carriage side panel having a first and a second bore.

4. The rim of claim 3 wherein said carriage is positioned between said housing side panels.

5. The rim of claim 4 wherein said screw assembly is comprised of a tube having a longitudinal bore, said longitudinal bore having a threaded portion and a power tool receptacle portion and a threaded bolt, said threaded bolt having a bore perpendicular to the length of said bolt, said tube rotatably disposed in a bushing, said bushing pivotably attached to said housing side panels.

6. The rim of claim 5 wherein said carriage is attached to said housing and to said threaded bolt by a first pin removably disposed through said slots in said housing side panels, through said first bores in said carriage side panels and through said bore in said threaded bolt and said carriage is attached to said housing by a second pin removably disposed through said slots in said housing side panels and through said second bores in said carriage side panels.

7. The rim of claim 6 wherein each said first and second pins each have a head end and an orifice end, and said first and second pins are connected by a cotter pin removably disposed in orifices in said pin orifice ends.

8. The rim of claim 7 wherein rotation in a first direction of said tube in said bushing extends said threaded bolt from said tube and expands said circumference of said circular metal band, and wherein rotation in the reverse of said first direction of said tube in said bushing contracts said threaded bolt into said tube and contracts said circumference of said circular metal band.

9. The rim of claim 8 wherein said rotation of said tube incrementally changes the circumference of said metal band.

10. The rim of claim 9 wherein said power tool receptacle portion of said longitudinal bore of said tube is configured to receive a ratchet.

11. The rim of claim 10 wherein said circumference of said circular metal band is incrementally expandable and contractible within the limits of the length of travel of said first and said second pins within said slots in said housing side panels.

12. The rim of claim 10 wherein said housing base plate is removably attached to said band to provide expansion and contraction of said band circumference in addition to said band circumference expansion and contraction provided by said pins and said slots.

13. The rim of claim 12 wherein said annular elastomeric member is comprised of:

a unitary annular molded elastomeric channel member having a base portion, an outer flange portion and an inner lip, said flange portion, said base portion, and said inner lip shaped to enclose a tire bead and a portion of a tire outer sidewall, said base portion having a ledge and a berm on opposite sides of a groove, and said circular metal band removably attachable within said groove.

14. The rim of claim 12 wherein said flange portion of said annular elastomeric member includes an annular sealing rib with a thickened rim for underlying engagement with a skirt of an outer tire curing envelope.

15. A radially expandable and contractible rim for securing elastomeric curing envelope sealing rings against tire beads for underlapping attachment of said rings to an outer elastomeric curing envelope in a tire retreading assembly, said rim comprising:

a) a generally U-shaped housing having a housing base and two housing side panels attached to said housing base;

b) a generally U-shaped carriage having a carriage base and two carriage side panels attached to said carriage base, said carriage slidably disposed between said housing side panels and slidably attached to said housing side panels;

c) an expandable and contractible screw assembly comprised of a tube having a bore with a threaded portion and a ratchet receptacle portion, and a threaded bolt disposed within said threaded portion of said tube, said tube rotatably attached to said housing and said threaded bolt attached to said carriage and slidably attached to said housing; said threaded bolt expandable and contractible from said tube by rotation of said tube;

d) a circular metal band attachable to a curing envelope sealing ring, said circular band having a first end and a second end, said first end of said metal band removably and adjustably attached to said housing and said second end of said metal band attached to said carriage, said circular metal band having a circumference which expands and contracts in response to expansion and contraction of said threaded bolt from said tube, and which is expandable and contractible in response to the position of said housing attachment to said band.

16. The rim of claim 15 wherein said curing envelope sealing ring is comprised of:

an annular molded elastomeric channel having an integral base portion, an outer flange portion and an inner lip, said flange portion, said base portion, and said inner lip shaped to enclose a tire bead and a portion of a tire outer sidewall, said base portion having a ledge and a berm on opposite sides of a groove, said circular metal band removably attachable within said groove of said elastomeric member.

17. The rim of claim 16 wherein said flange portion of said annular elastomeric member includes an annular sealing rib with a thickened rim for underlying engagement with a skirt of an outer tire curing envelope.

18. In a sealing ring for retreading tires by sealing an annular outer elastomeric curing envelope to a tire having a crown and opposed side-walls terminating in a pair of inner peripheral beads, said outer envelope having an inwardly opening U-shaped radial cross-section for enclosing a tread strip secured around the crown of the tire casing and having skirts extending alongside annular portions of the outer side walls of the tire casing, the improvement comprising:

an annular molded elastomeric channel member having a integral base portion, an outer flange portion and an inner lip, said flange portion, said base portion and said inner lip shaped to enclose a tire bead and portion of a tire outer side wall, said base portion having a ledge and a berm on opposite sides of a groove, said groove constructed to hold a rim having a circumference which expands and contracts in response to the expansion and contraction of the tire casing, whereby use of a pair of sealing rings enables a sealed outer enclosure to be provided for the tire casing.

19. The sealing ring of claim 18 wherein said flange portion of said annular elastomeric channel member includes an annular sealing rib with a thickened rim for underlying engagement with a skirt of an outer tire curing envelope.

20. The sealing ring of claim 19 wherein expansion of said rim stretches said sealing ring and expands the circumference of said sealing ring enabling said sealing ring to be mounted against said tire bead, and enabling a vacuum to be drawn within said sealed outer enclosure.

* * * * *